G. D. GREEN.
AUTOMATIC COIN CONTROLLED SCALE.
APPLICATION FILED FEB. 28, 1913.

1,087,116. Patented Feb. 17, 1914.
4 SHEETS—SHEET 1.

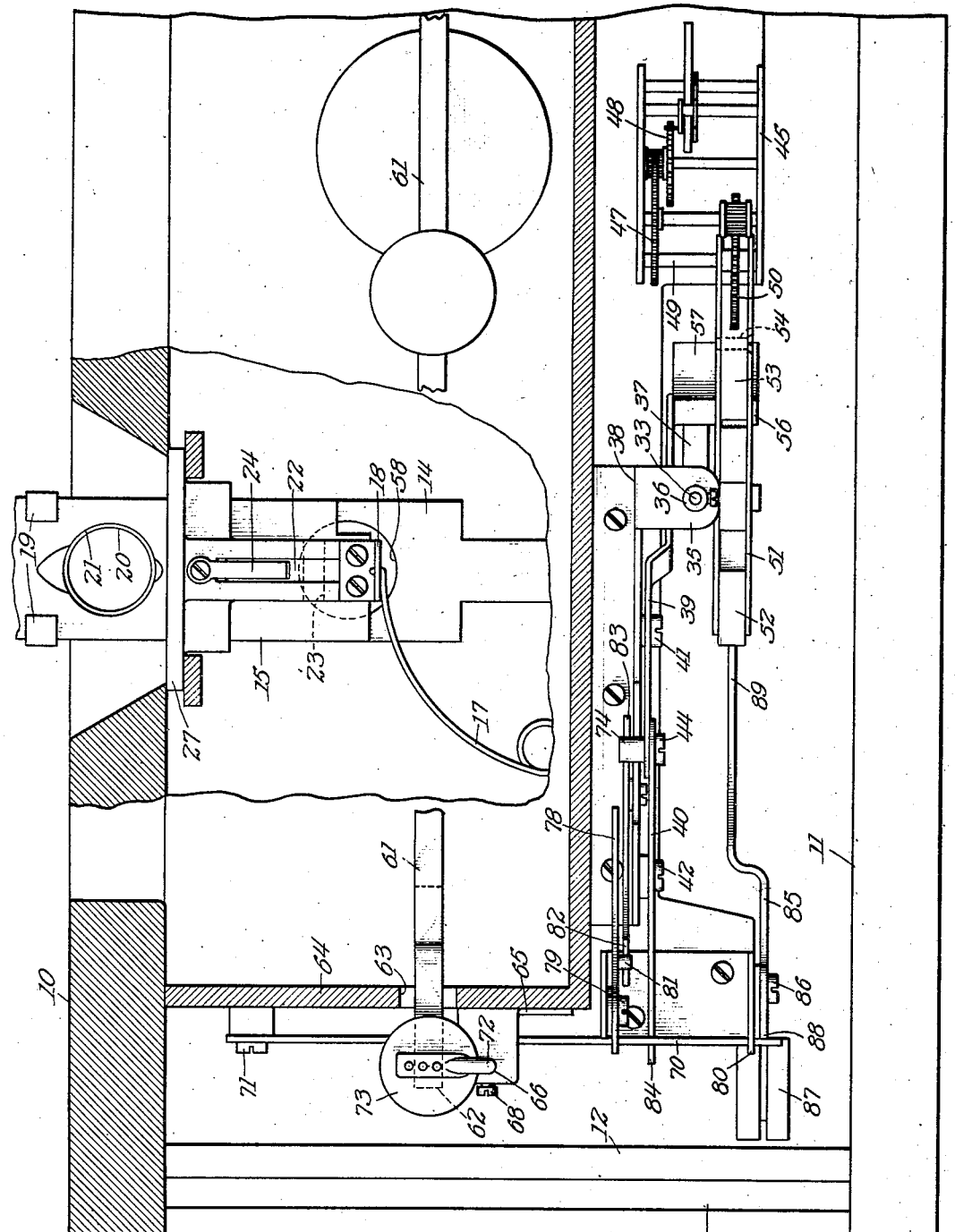

UNITED STATES PATENT OFFICE.

GEORGE D. GREEN, OF CHICAGO, ILLINOIS.

AUTOMATIC COIN-CONTROLLED SCALE.

1,087,116.  Specification of Letters Patent.  Patented Feb. 17, 1914.

Application filed February 28, 1913. Serial No. 751,233.

*To all whom it may concern:*

Be it known that I, GEORGE D. GREEN, a citizen of the United States, residing at Chicago, in the county of Cook and State of Illinois, have invented certain new and useful Improvements in Automatic Coin-Controlled Scales, of which the following is a specification.

My invention relates to improvements in automatic coin-controlled scales.

One of the objects of my invention is to provide an automatic attachment for an ordinary platform scale whereby the scale may be unlocked for a predetermined period of time, say one minute or more, in which it may be freely used for the purpose of weighing individuals or other objects and things, and after the expiration of the predetermined period of time the scale will become automatically locked. Through the instrumentality of a coin, dropped into a suitable receptacle associated with the attachment, and the movement of an appropriate part, the scale may become unlocked and a suitable time-measuring device thereby postentiated. During a suitable period of time, succeeding this operation, the scale may be freely used.

In the use of my automatic device, a person may stand upon the platform of the scale and insert a suitable coin within a receptacle provided therein and, by a subsequent operation, such as pushing in a slide made possible by the instrumentality of a coin, move an unlocking device, which normally holds the scale beam locked against movement, and at the same time said slide movement potentiates a horological motor which controls said locking means, and which will, after a predetermined lapse of time after its potentiation, automatically restore the locking means to its normal position and thereby lock the scale beam against further movement or use.

While my invention is desirably applicable to an ordinary platform scale to be placed in public places for the accommodation of the public, it will, of course, be understood that it can be used for other purposes wherein it becomes desirable to unlock or release an active part, and to permit its free operation for a predetermined lapse of time, after which it is to be again automatically locked or secured against movement.

Other and further objects of my invention will become readily apparent to persons skilled in the art from a consideration of the following description when taken in conjunction with the drawings, wherein—

Figure 1:
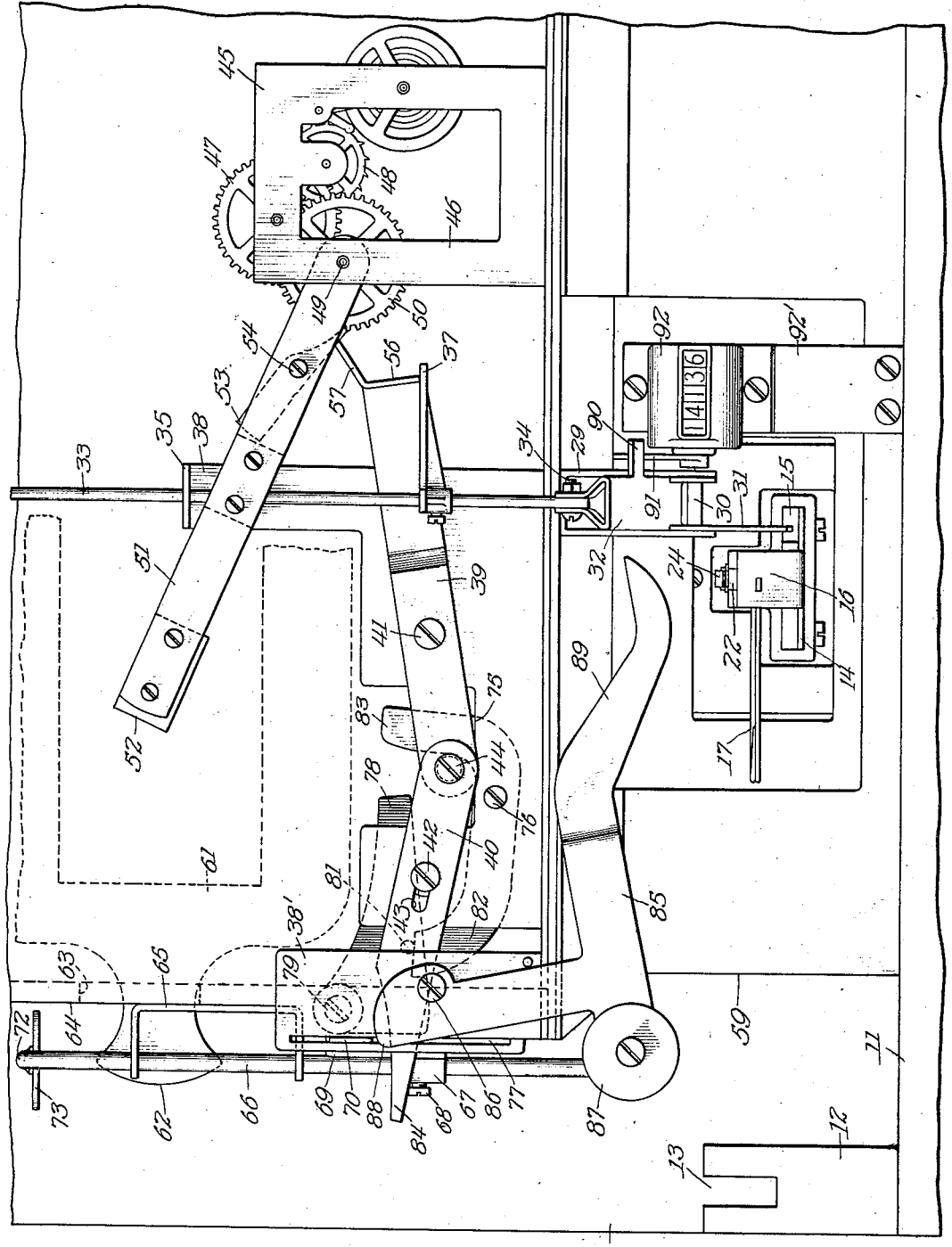
Figure 2:
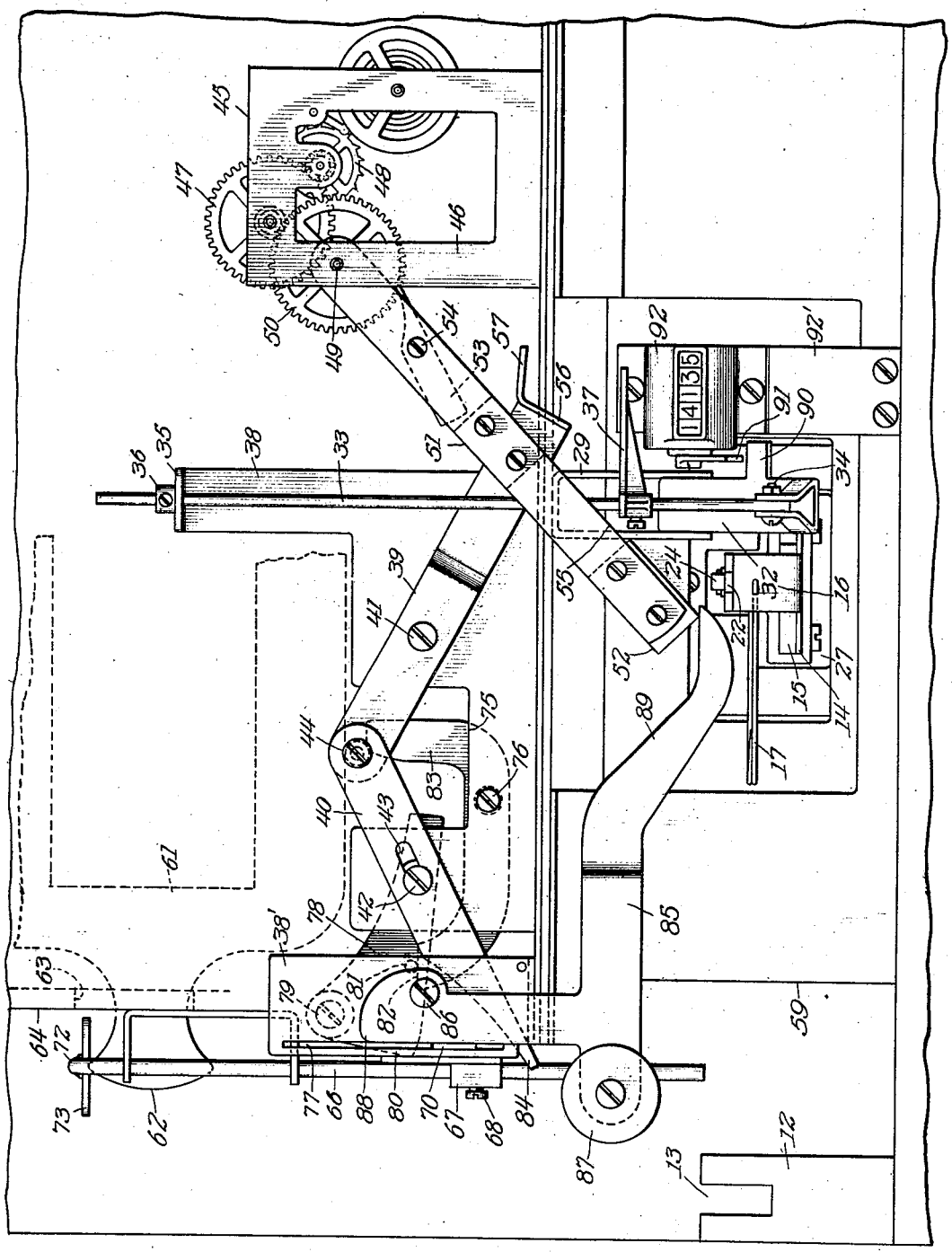
Figure 3:
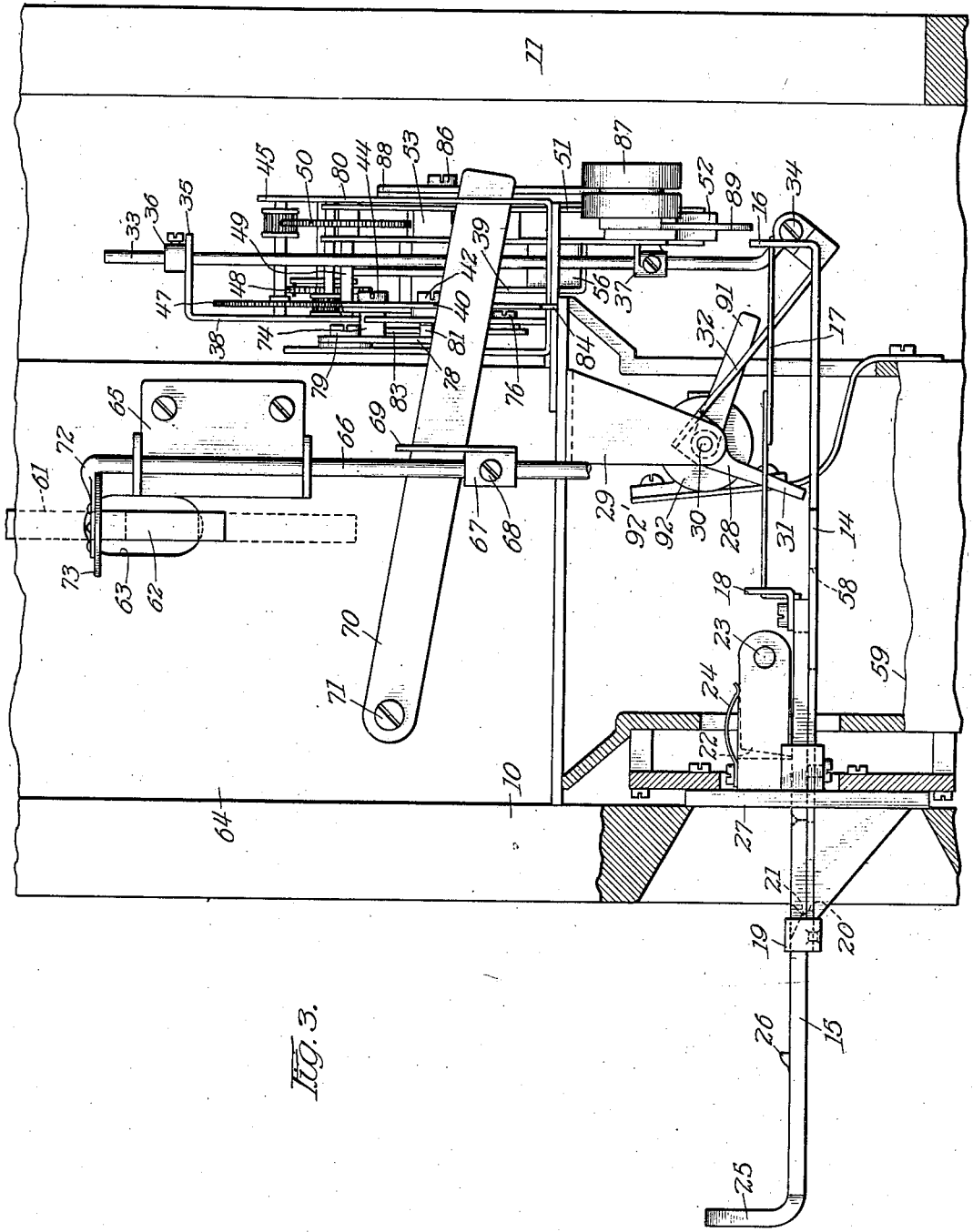

Figure 1 is a rear elevation of my attachment, shown as applied to a platform beam scale, and showing the positions of the parts at the time the horological motor is potentiated and the scale beam unlocked; Fig. 2 is a similar view showing the parts of the scale beam locked and the horological motor inert; Fig. 3 is a side elevation showing the positions of the parts with the scale beam locked; and Fig. 4 is a plan view, partly in section, showing the parts in normal position.

In all the views the same reference characters are employed to indicate similar parts.

10 is a front wall and 11 is a rear wall of a casing which partly surrounds the beam of the scale and which contains my locking attachment and which may also be part of the vertical casing containing the standard and mechanism of the scale communicating between the platform and the scale beam.

12 is an end wall, of which there is another on the other end of the casing, showing a groove 13 by which a removable panel may be inserted, removal of the panel affording access to part of the mechanism of my device. In the rear wall there is a removable door, not shown in the drawings, for access to the apparatus, as shown in Figs. 1 and 2, and in the casing below this door there may be contained a coin drawer, or other receptacle, for receiving the coins or tokens which are necessary to be inserted in the mechanism preliminarily to its operation.

14 is a fixed guide, or rest, for the slide 15. The slide 15 is turned up at its inner end, as at 16, for support of a spring 17, which is attached to the bracket 18 of the slide 15, and normally retains the slide in the projected outward or extended position. The guide 14 is folded over at its front end, as at 19, to serve as a front lateral guide for the slide 15. The guide 14 is provided with a perforation near its front end, as at 20, which is a trifle smaller than the token adapted to be inserted in the slot 21 of the slide 15. The coin or token, to be inserted in the perforation 21 of the slide 15, is substantially as thick as the body portion of the slide 15. A vertically movable dog or stop 22 is pivoted, as at 23, and is normally held by spring 24 in contact with the upper surface of the slide 15. If the slide 15 be pushed inwardly by contact with its upturned end 25, the forward end of the dog 22 will drop into the slot 21, and when the front end of the slot 21 comes into contact, with the front end of the dog 22 no further inward movement of the slide can be effected, and this limited movement is not sufficient to operate the mechanism to be hereafter described.

When a coin such as a penny or other suitable token is dropped into the slot 21 of the slide 15, and the slide is pushed inwardly, the token will maintain the dog 22 in raised position and permit the slide 15 to be pushed inwardly to its fullest extent until the stop 26 comes in contact with the closure plate 27, thus preventing further inward movement of the slide 15, and at this time the slide has sufficiently moved the potentiating mechanism and the unlocking mechanism of the device. In the operative movement of the slide 15, its inner end is brought into contact with a three-arm bracket 28, pivoted in the frame 29, as at 30. The slide makes contact with the lower arm 31 and raises the angularly inclined arm 32. The arm 32 is connected to a vertically suspended rod 33 as by screws 34. The vertical rod 33 is suspended freely and pendulously by the bracket 35 as by collar 36. Secured to the vertically moving rod 33 is a vertically adjustable bracket 37. To the frame 38 is pivotally secured two levers 39 and 40, as at 41 and 42, respectively. The lever 40 is pivoted at 42, and is provided with some lost motion in the slot 43. The levers 40 and 41 are pivoted together as by a screw 44. The jointly pivoted ends of the levers 40 and 41 are free to bodily move, vertically, as shown in Figs. 1 and 2.

The horological motor 45 may be any time-measuring device, such as a clock movement, or a dash pot, but for the purpose of clear disclosure I have shown a frame 46 containing a train of gears 47, and an escapement 48, of the usual well known type. Journaled to the arbor 49 of the power wheel 50 is a weighted lever 51, carrying a suitable weight on its outer end, as at 52. This lever, when in raised position, constitutes the motor-potentiating means. A gravity operated pawl 53 is pivoted to the lever, as at 54, and engages the teeth of the power wheel 50.

When the vertical rod 33 is raised, as by raising the arm 32 of the bracket 28 by instrumentality of the slide 15 as heretofore described, the bracket 37 is first brought into contact with the lever 51, as at 55, and upon the further upward movement of the rod 33, the bracket 37 is brought into contact with the lower curved end of the lever 39, as at 56. The angular portion 57 of the arm 39 underlies the pivoted lever 51, and when the bracket 37 moves up and first makes contact with the knee part 56 of the lever 39, the upper portion 57 of the lever is brought into contact with the pivoted lever 51, and on further upward movement the laterally extending end 57 is brought into intimate contact with the pivoted lever 51, to raise the lever 51 to its ultimate height, as shown in Fig. 1.

When the slide 15 has been pushed in to its furtherest inward position and released, the coin or token which has been inserted into the slot 21 of the slide will fall from the slot through the aperture 58 of the guide 14 and into a coin box 59 therebelow and after the pressure applied to the slide 15 has been released, the spring 17 will return the slide 15 to its normal outmost position and the rod 33 will drop down and permit the bracket 37 to descend below the path of the pivoted lever 51, thereby permitting the pivoted lever 51 to supply power to the motor mechanism, heretofore referred to.

An accessible scale-beam 61 having suitable slidable weights, is provided with a projection 62 which extends through a slot 63 in a plate 64. The slot 63 is sufficiently long to permit free oscillatory movement of the scale beam 61 to perform its ordinary weighing function.

Mounted on the plate 64 is a bracket 65, in which a vertical rod 66 is adapted to move freely. The rod 66 carries an adjustable clip 67 which is vertically adjustable upon the rod by means of the screw 68. Secured to the clip 67 is a slotted plate 69 through which a lever 70 passes freely. The lever 70 is pivoted to the plate 64, as at 71. The upper end of the vertically moving rod 66 extends laterally, as at 72, and carries a disk 73 which overlies the end 62 of the scale beam 61, and when the parts are in the positions shown in Fig. 3, they constitute a direct means by which the scale beam 61 is locked in position and thereby retained against movement.

The screw 44, by which the levers 39 and 40 are pivoted, carries on its end a stud 74 which is adapted for engagement with the lever 75, pivoted to the frame 38, as at 76.

The front end of the lever 70 passes through a slot 77 made in a front vertical extension of the frame 38 and indicated at 38'.

A latch 78 is pivoted to a rear portion of the frame 38, as at 79, and has a stop portion 80 which extends across the slot 77 and in the path of the lever 70. The latch 78 carries a laterally extended pin 81 which is normally in contact with the shorter upturned end 82 of the lever 75.

When the levers 39 and 40 have their pivoted ends depressed, as shown in Fig. 1, the stud 74, connected to the screw 44, rides on the inner edge of the upper and longer vertical arm 83 of the lever 75, thereby causing the shorter arm or end 82 of the lever 75 to be raised, and by its contact with pin 81 of the latch 78, the stop end 80 of the latch is lifted out of the path of the upwardly moving lever 70. As the lever 39 is lifted, in the manner heretofore described, the outer end 84 of the lever 40 will be correspondingly lifted as their joined ends descend, and the end 84 will engage the under side of the lever 70, thereby raising it to the position shown in Fig. 1. As the lever 70 passes through the slot in the plate 69 secured to the vertical rod 66, it raises the end 73 from engagement with the projection 62 of the scale beam 61, and permits the normal movement of the scale beam. As soon as the lever 70 has been lifted, in a manner heretofore described, a balance latch lever 85, which is pivoted to the portion of the frame 38' as at 86, will be automatically moved by gravity, through the instrumentality of its weighted end 87, until the end 88 has passed under the lower end of the lever 70, and thereby it retains the lever 70 in its raised position. At the same time that this automatic movement of the latch lever 85 has been effected, the extended end 89 will have been lifted. Now at this time the scale beam may be operated freely while the parts are in the positions described and shown in Fig. 1. As soon as the potentiating lever 51 has been raised to the position shown in Fig. 1, the parts will be immediately restored to their former positions, with the exception of the potentiating lever 51 and the gravity operating latch lever 85. At this time, the potentiating lever 51 will begin its gradual descent, and will continue to gradually fall until the predetermined time, say one minute, has elapsed, such lapse of time being controlled by the escapement of the horological motor. At this time, the lower end 52 of the potentiating lever 51 will be brought into contact with the gravity-operated latch lever 85 and the weight of the lever 51, pressing upon the extended end 89 of the latch lever 85, will serve to move the end 88 of lever 85 out of the path of the lever 70, whereupon the lever 70 will fall and will carry with it the vertical rod 66 and the overlying cap 73. The cap 73 will then be brought into close contact with the extension 62 of the beam 61, but the beam could be lifted if it were not for the fact that the lever 70 is now locked by the part 80 of the latch lever 78 once more crossing the slot 77 and preventing the raising of the lever 70 which controls the locking means for the scale beam.

The horological motor 45 may be set for a predetermined space of time, say one minute, and this mechanism will control the length of time the scale remains unlocked after being operated through the instrumentality of a penny or other token, before it will again become automatically locked.

When the three arm lever 28 is moved, as heretofore described, the arm 90 thereof is brought into contact with an arm 91 of a recording counter 92, so that each time the mechanism is operated, in the manner heretofore described, the counting device 92 will indicate and thereby the coins or tokens that are passed through the machine will be automatically registered.

It is, of course, evident that other suitable timing mechanism than that shown may be employed for controlling the locking mechanism, and it is equally true that other devices than scale beams may be controlled by my locking and unlocking mechanism without departing from the spirit and intendment of the invention and within the scope of the appended claims.

What I claim is:

1. In a device for locking and unlocking a freely movable member the combination of a casing containing the mechanism, means operable from without the casing for unlocking said mechanism, means operable by a time measuring means for subsequently locking said mechanism, a time measuring means comprising a train of gears, an escapement and a weight, said weight adapted to be potentiated by said unlocking means, and means normally in the path of the weight as it descends, adapted to permit said locking operation.

2. In a device for locking and unlocking a freely movable member the combination of a casing for inclosing the mechanism, a locking bolt for engagement with said member, a lever controlling the said bolt, mechanism for lifting the said lever and the bolt, means controlled by a time measuring means for retaining said lever in lifted position for a predetermined period of time and permitting the bolt to return to its normal position, and means for securing the said lever in locked position.

3. In a device for locking and unlocking a freely movable member, the combination of a locking bolt to be retained in locked and unlocked position, means for retaining the bolt in unlocked position, a potentiating means for moving said bolt out of its locked position, time measuring means set in operation by said potentiating means and adapted to release said retaining means and to permit the bolt to return to its normal position, and means operable by the return of said bolt for maintaining said bolt in locked position.

4. In a device of the character described for locking and unlocking a freely movable member, the combination of a potentiating means, a time controlled locking means comprising a train of gears, an escapement and a weighted and pivoted lever normally at rest for operating said train of gears, a locking bolt normally retaining the movable member in locked position, said bolt being adapted to be moved to unlocked position, means connecting said bolt and weighted lever with said potentiating means, whereby to potentiate said lever and to move the said bolt to unlocked position, and a latch adapted to automatically engage said bolt to prevent its movement after return to said locked position.

In testimony whereof I hereunto set my hand in the presence of two witnesses.

GEORGE D. GREEN.

In the presence of—
MARY F. ALLEN,
W. LINN ALLEN.